March 22, 1938.   E. A. SLYE   2,111,996
LIQUID DISPENSING APPARATUS
Filed Aug. 15, 1932   4 Sheets-Sheet 1
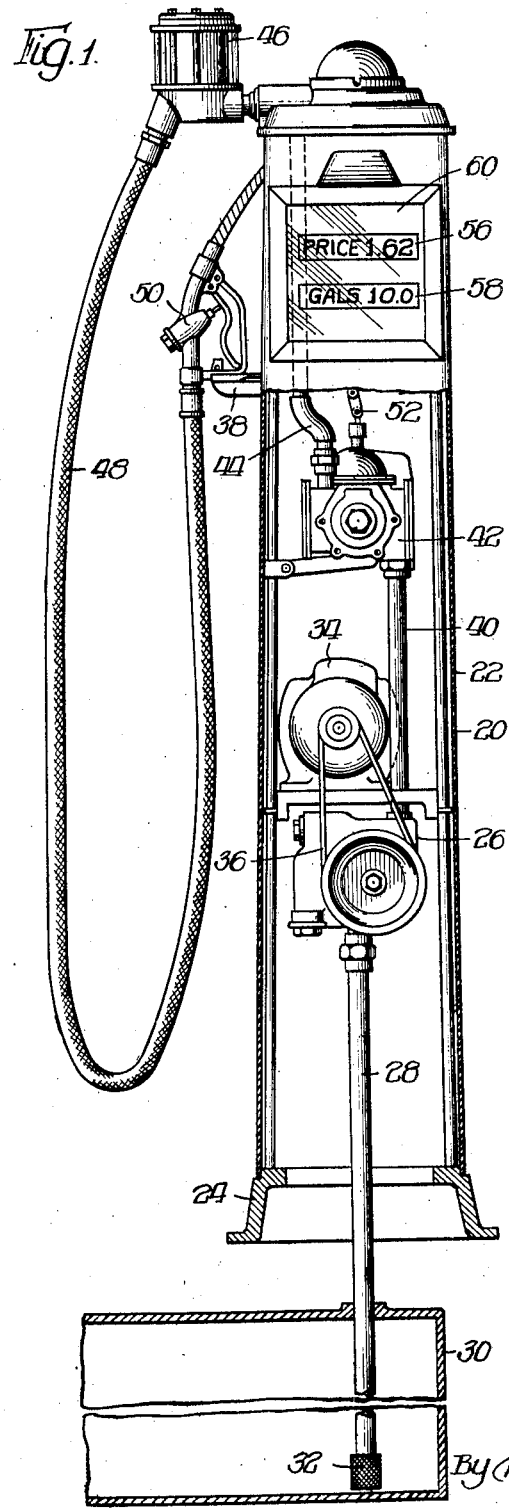
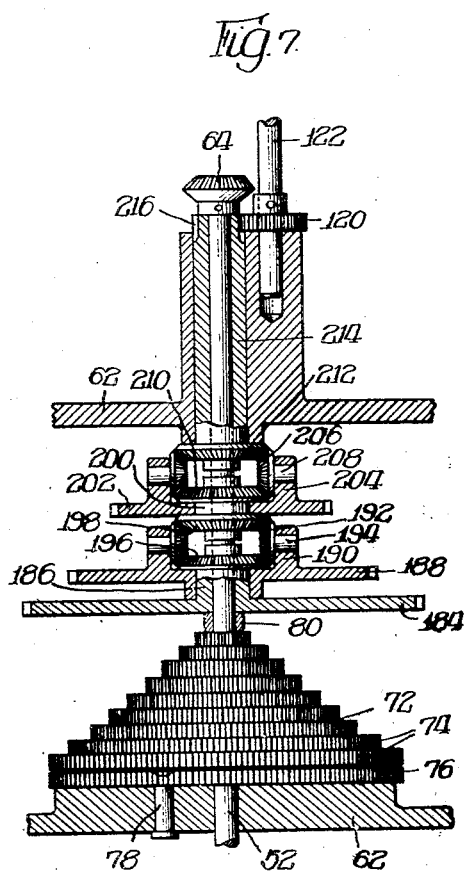
Inventor:
Edward A. Slye

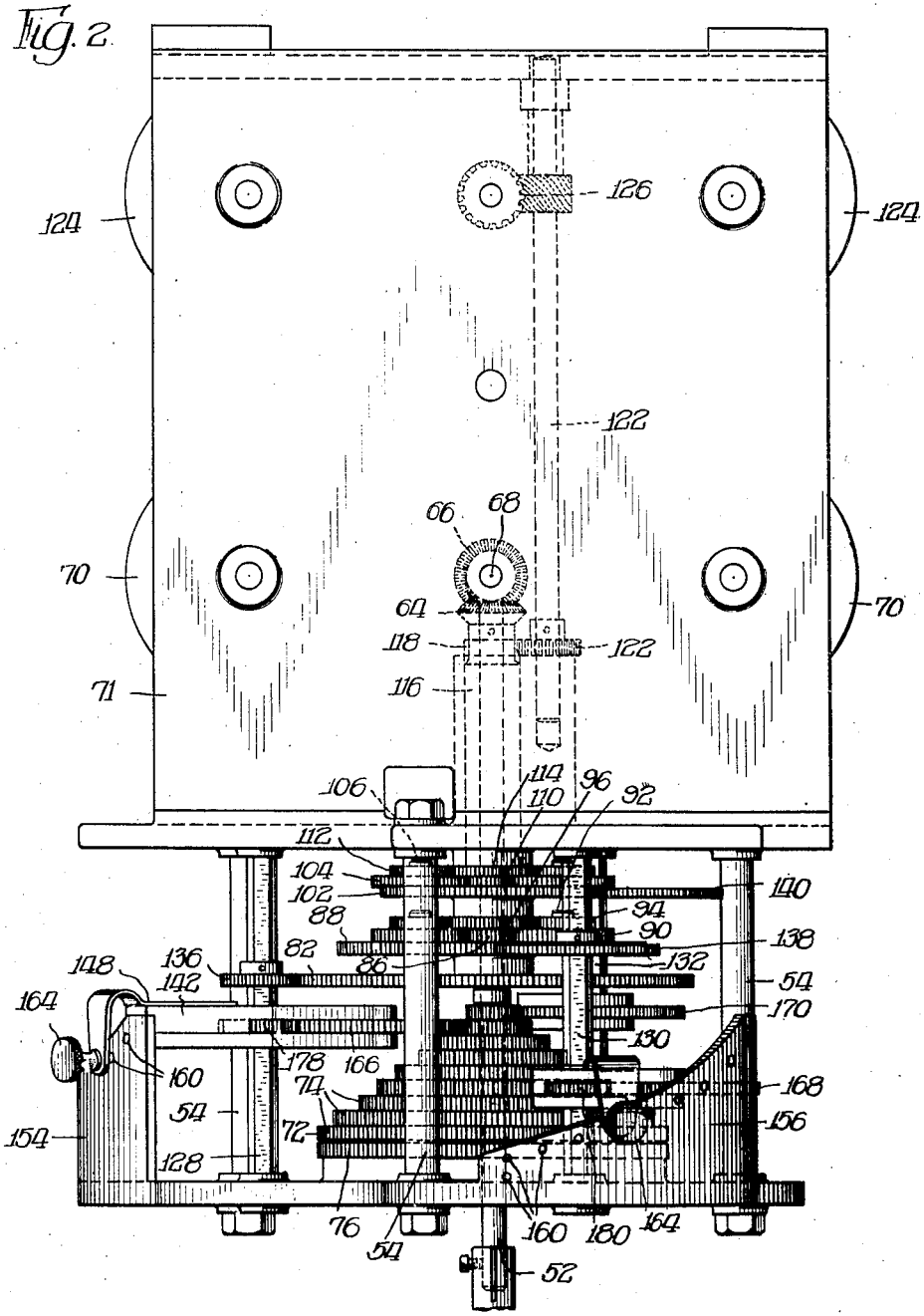

March 22, 1938.　　　　E. A. SLYE　　　　2,111,996
LIQUID DISPENSING APPARATUS
Filed Aug. 15, 1932　　　　4 Sheets-Sheet 3

Inventor:
Edward A. Slye,

Inventor:
Edward A. Slye,

Patented Mar. 22, 1938

2,111,996

UNITED STATES PATENT OFFICE 2,111,996

LIQUID DISPENSING APPARATUS

Edward A. Slye, East Hartford, Conn., assignor, by mesne assignments, to Wayne Company, Fort Wayne, Ind., a corporation of Indiana Application August 15, 1932, Serial No. 628,868

8 Claims. (Cl. 74—283)

This invention pertains to liquid dispensing apparatus.

Liquid dispensing apparatus now in use are of two principal types, namely, the so-called visible type, and the meter type. The more desirable of these two types is the meter type, which consists essentially of an operating pump connected to a source of liquid supply, the pump being adapted to supply liquid to a meter where it is measured, after which it is dispensed through the usual hose and nozzle connection. The meter is adapted to operate a clock or other recording mechanism to show the amount of liquid dispensed through the hose and nozzle. It is customary to provide this type of liquid dispensing apparatus with a card to be displayed somewhere on the casing adjacent the clock, the card being used to compute the price of any amount of gasoline or other liquid dispensed from the device. The objections to this method of computation are that for different localities different cards must be used as the prices vary, and of course the prices vary for the same localities from time to time. There is then the liability that the cards may not be supplied at the proper time, and also the objection that the figures on the computing card are so small that the customer purchasing gasoline from a dispensing station cannot see the numerals from his automobile, there being grave dangers of error in either case. There is a further objection that the prices on these cards are only for full gallon units, and if a fraction of a gallon is dispensed there is no way of accurately determining the cost of this amount. Also, in meter pumps there is no positive way to dispense only a unit, and so in case the registering hand of the clock overruns the unit measure, either the customer has to pay an estimated amount, or the service station owner has to lose this fraction of a unit to the customer.

It is therefore an object of this invention to provide a liquid dispensing apparatus which itself registers both the amount of liquid dispensed and also registers the total price of such liquid dispensed.

Another object is to provide a liquid dispensing apparatus wherein means is provided for indicating the total price of any amounts of liquid dispensed, as for example gallons or fractions thereof, the means being adjustable at the liquid dispensing apparatus to correspond to any price variations of units dispensed.

A further object of the invention is to provide readily adjustable variator means for transferring the result of a plurality of movements from a source to a single receiving means.

A still further object is to provide a motor operated liquid dispensing apparatus having a measuring and recording meter and automatically actuated computers for indicating the quantity of liquid dispensed or to be dispensed and the price charged or selected for the total amount of liquid so dispensed, and wherein a totalizing mechanism is provided to at all times accurately disclose the total quantity of liquid dispensed and the total amount of dollars and cents received for the same.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary sectional elevation of a liquid dispensing apparatus embodying the invention;

Figure 2 is an enlarged side elevation of the indicating mechanism and the cooperating variator mechanism;

Figure 7 is a fragmentary sectional elevation corresponding to Figure 3, showing a modified form of variator mechanism.

Figure 3:
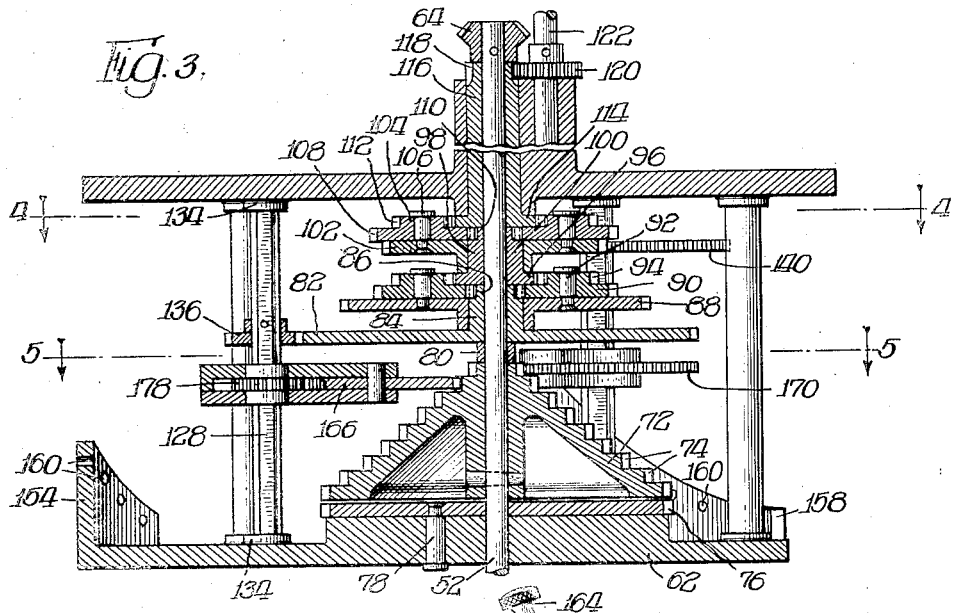
Figure 3 is an enlarged fragmentary sectional elevation of the variator mechanism.
Figure 4:
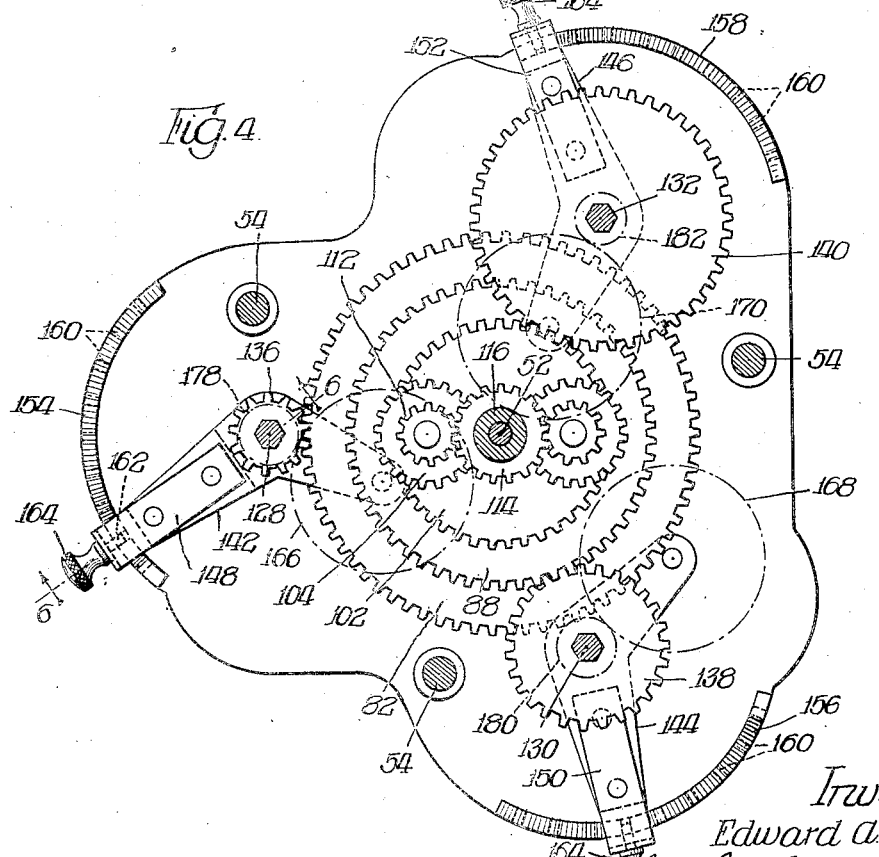
Figure 4 is a sectional top plan view of variator mechanism shown in Figure 3, the same being taken substantially in the plane as indicated by the line 4—4 of Figure 3.
Figure 5:
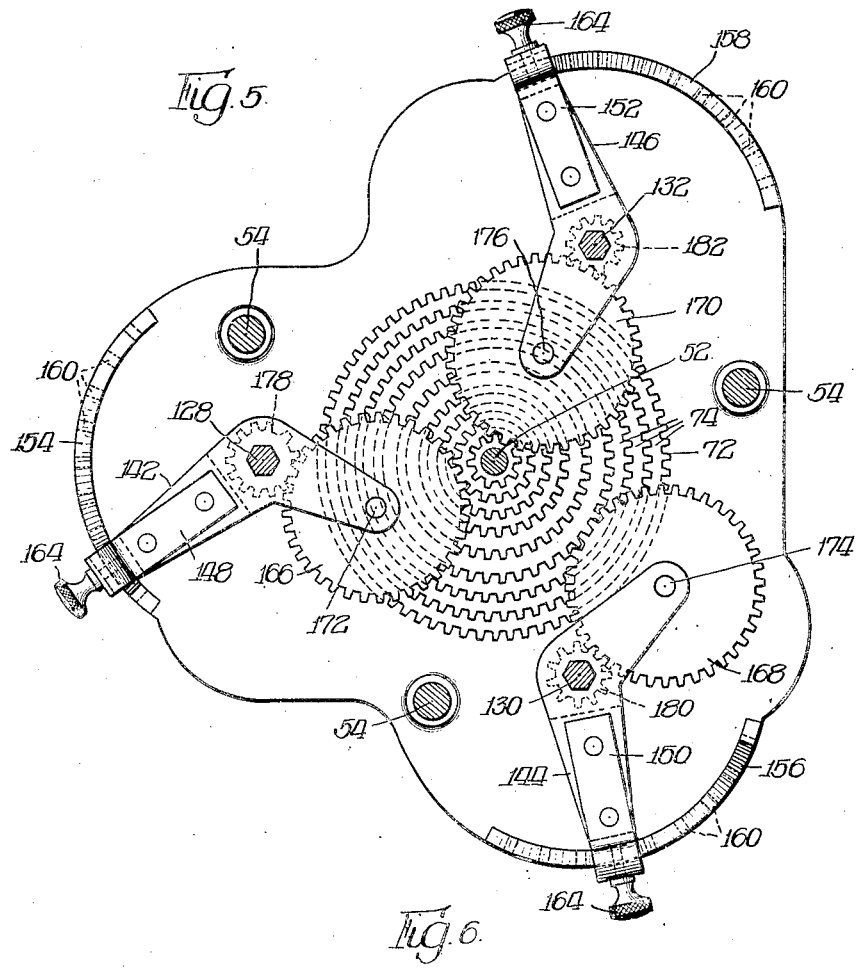
Figure 5 is a sectional top plan view corresponding to Figure 4, the same being taken substantially in the plane as indicated by the line 5—5 of Figure 3.
Figure 6:
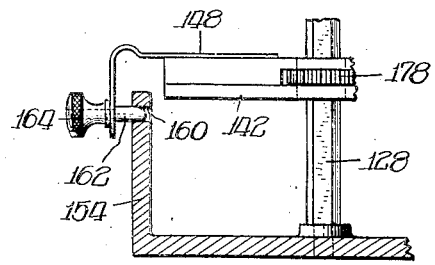
Figure 6 is a fragmentary sectional elevation of a portion of the setting mechanism of the variator, the same being taken substantially in the plane as indicated by the line 6—6 of Figure 4.

Referring first of all more particularly to the construction illustrated in Figures 1 to 6 inclusive, the liquid dispensing apparatus 20 includes a casing 22 supported on a pedestal 24. The pump 26 is connected on the suction side thereof to the pipe 28 which is in communication with the source of liquid supply 30 through foot valve 32. The pump is adapted to be operated by the motor 34 through suitable means such as the belt 36, the pump being controlled through a suitable switch (not shown) operating from the hose hook of support 38.

The outlet side of the pump 26 is connected to the pipe 40 connected to the inlet side of the meter 42 which may be of the piston displacement type. The meter may be of any suitable type accurately measuring the amounts of liquid supplied thereto and passing therethrough, the measured liquid flowing through the pipe 44 to the sight gauge 46 and being dispensed through the hose 48 and the hand operated nozzle 50. As shown in Figure 1, the nozzle is supported on the hook 38 in which position the motor 34 is inoperative. In order to operate the motor it is necessary to remove the nozzle 50 from the hook 38 and to raise said hook, and it is necessary for measuring operation of the meter that the valve in nozzle 50 be operated to permit the flow of liquid therethrough.

The operation of the meter 42 operates the shaft 52, said shaft being rotatable to operate the mechanism of the clock operating mechanism 54. The operation of the clock operating mechanism 54 will cause the numerals to appear in their proper sequence and relation on the dials 56 and 58 of the clock device 60, to indicate the price and the corresponding number of units dispensed respectively.

Referring now more particularly to the operation of the variator, or clock, or indicating operating mechanism 54, the shaft 52 is journaled in the casing 62 and is suitably connected through the gears 64 and 66 to the shaft 68 for operating the gallon indicator wheels 70 of the clock 71, said wheels being provided with suitable indicia for indicating the number of gallon units dispensed. The clock 71 as shown is of the counter type and may be of any suitable construction. The shaft 52 is provided with a gear cone 72 fixedly mounted thereon and provided with a suitable number, in the present case nine, of graduated gear steps 74, the gear cone being disposed adjacent the fixed gear 76, of similar pitch diameter to the largest of the gear steps 74, the fixed gear being secured to the casing 62 as at 78.

The shaft 52 is provided with a spacing member 80 serving as bearing means for the spur gear 82 rotatably mounted on the shaft 52 and provided with the hub or bearing portion 84 and the toothed portion or pinion 86. Spur gear 88 is rotatably mounted on the hub or bearing 84 and is provided with a plurality (shown two) of driving gears 90 arranged in a differential manner and pivotally mounted thereon as at 92. The gears 90 are provided with a suitable number of teeth meshing with the teeth of the toothed portion 86 of the gear 82, and the gears 90 are provided with a stepped tooth portion or smaller pinion 94, the teeth thereof meshing with the toothed portion 96 of the thimble or sleeve 98. The sleeve 98 is rotatably mounted on the shaft 52 and is provided with a hub or bearing portion 100 on which the spur gear 102 is rotatably mounted, gear 102 being provided with the driving gears 104 (shown two) similar to the spiders 90 and pivotally mounted thereon as at 106, being also arranged in a differential manner. The gears 104 are provided with a toothed portion 108 meshing with the toothed portion 110 of the thimble 98, and the gears are also provided with the smaller pinion portions 112 meshing with the toothed portion 114 of the hollow shaft or sleeve 116. The sleeve 116 is journaled in the casing 62 and is rotatably mounted on the shaft 52, being provided with pinion portion 118 having meshing engagement with gear 120 fixedly mounted on the shaft 122 journaled in the casing 62 and operating the price counters 124, shown on the dial 56, through suitable gearing 126.

The casing 62 is provided with the plurality (shown three) of hex shafts 128, 130 and 132 journaled for rotation as at 134 in the casing 62, the number of shafts corresponding to the number of counters on the price dial. The hex shafts are provided respectively with the gears 136, 138, and 140 meshing respectively with the toothed gears 82, 88, and 102. Each of the hex shafts is provided with a slidable bell crank 142, 144, and 146, each having a shifting lever 148, 150, and 152 disposed in sliding cooperation with the cams 154, 156, and 158. Each of the cams is provided with apertures 160 disposed to correspond to each of the gear steps 74 whereby when the pin 162 of the selected knob 164 is engaged with any selected aperture 160, and the gears 166, 168, and 170 pivotally mounted as at 172, 174, and 176 to the respective bell cranks are in mesh with the gear step 74 corresponding to said aperture. The gears 166, 168, and 170 mesh respectively with the gears 178, 180, and 182 slidably mounted in the hex shafts whereby rotation of the shaft 52 will cause the gear cone to rotate the respective gears 166, 168, and 170 to rotate the respective hex shafts through the gears 178, 180, and 182.

In the embodiment of the device shown, the shifting lever 148 is the adjustment for variations of units of $\tfrac{1}{10}$ of a cent. The shifting lever 150 is the adjustment for variations of units of one cent, and the shifting lever 152 is the adjustment for variations of units of ten cents. As shown, the shifting levers are set for computing amounts dispensed at the rate of 16.2 cents. By this setting it will be seen that the shifting lever 152 is arranged so that the gear 170 meshes with the topmost gear step of the gear cone 72; that is, the first or highest aperture of the cam 158 is engaged. The shifting lever 150 is arranged for six cent units, in which case the sixth aperture of the cam 156 is engaged; that is, the gear 168 is disposed to engage the sixth gear step 74 counting from the smaller thereof. The shifting lever 148 is arranged for $\tfrac{1}{10}$ of a cent whereby the second aperture of the cam 154 is engaged; that is, the gear 166 engages the second smallest gear step 74. It will thus be appreciated that any setting within price variables of liquid, such as gasoline, may be effected by a simple movement of the shifting levers. For example, if the price of gasoline increases from 16.2 cents to 16.5 cents, it is only necessary to move the lever 148 so that the fifth aperture 160 of the cam 154 is engaged. Any other adjustments may be made on the other cams to vary the respective ten cent and one cent variables.

In the operation of the device, assume that the clock mechanism as illustrated by the counter wheels 70 and 124 is of any suitable construction, and assume that the counters are set to zero. In order then to dispense liquid to any receptacle, for example, an automobile tank, the nozzle 50 is removed from the hook 38 and inserted into the fill opening. Upward movement of the hook 38 will close the suitable switch to cause operation of the motor 34 and consequently the pump 26. No liquid will be dispensed, however, until the valve in the nozzle 50 is opened. Until this takes place the liquid is by-passed in a suitable by-pass provided in the pump.

Upon operation of the nozzle 50 liquid will be drawn from the source of supply 30 through the pipe 28 and supplied through pipe 40 to the meter 42, where it will be measured and will be supplied from the meter through the pipe 44 to the sight gauge 46, the hose 48 and thence to the tank through the nozzle 50. Measuring operation of the meter will cause shaft 52 to rotate, the shifting levers having already been set at the selected amount of 16.2 cents per gallon. Rotation of the shaft 52 will cause the gear cone 72 to rotate the gears 166, 168, and 170, to thereby cause rotation of the hex shafts 128, 130, and 132 through the respective gears 178, 180, and 182.

Rotation of the hex shafts causes rotation of the gears 136, 138, and 140 to thereby impart rotation respectively to the gears 82, 88, and 102. Rotation of the gear 102 causes the gears 104 to rotate on their respective axes 106 around the gear teeth 110 of the thimble 98. Relative rotations will thus cause the gears 104 to rotate the sleeve 116 through the pinion 112, and the cooperating toothed portion 114 of the sleeve. However, the thimble 98 is also being rotated by the pinion 94 of the gears 90, the gears being mounted on the gear 88, relative movement being caused through the meshing of teeth of pinion 86 and cooperating teeth of gears 90, whereby the gears 90 rotate with respect to the bearing 84 of the gear 82. This gear, however, is being rotated through the gear 136. Rotation of the sleeve 116, therefore, is effected through the movements of the bearing 84 of the thimble 98 and the movement imparted to the sleeve 116 through the idlers 104.

This combined rotation of the sleeve 116 as imparted to the shaft 122 will cause operation of the price indicating counter means 124 relative and corresponding to that of the gallon indicating counter means 70. In the event that the price of the liquid dispensed is in even cents, for example, 16 cents, the shifting lever 148 corresponding to the tenth variable units is moved so that the gear 166 is in mesh with the stationary gear 76. There then will be no rotation of the shaft 128 and consequently no rotation of a gear 82 whereby the only movement of the sleeve 116 will be as effected by movement of the gears 88 and 102 in a manner similar to that already described.

In a similar manner, either of the other shifting levers may be moved to engage the fixed gear 76, in which case only operation of the sleeve 116 will occur as effected by a single one of the shafts 130 or 132.

The modification illustrated in Figure 7 is similar to that illustrated in Figure 3, being modified only in that bevel gears are used as differentially arranged driving gears, and the gears cooperating therewith. In this modification the casing 62 accommodates the shaft 52, the fixed gear 76 being secured to the casing 62 as at 78. The gear cone 72 is mounted on a shaft 52 and the gear 184 is rotatably mounted on the shaft 52, being spaced from the gear cone by means of the spacer 80, all as particularly described.

The gear 184 is provided with the bearing 186 on which the gear 188 is rotatably mounted. The gear 188 is provided with the lugs 190 (two in number) on which the bevel spider gears 192 are rotatably mounted as at 194, and the bevel spider gears 192 mesh with the bevel gears 196 fixedly mounted on the bearing 186. The bevel spider gears 192 also have meshing engagement with the bevel gear 198 fixed to the bearing 200 rotatably mounted on shaft 52. The gear 202 similar to gear 102 is rotatably mounted on the bearing 200 and is provided with the lugs (two in number) 204 on which the bevel spider gears 206 similar to bevel spider gears 192 are rotatably mounted as at 208.

The beveled spider gears 206 mesh with the bevel gear 210 fixedly mounted on the bearing 200 and the bevel spider gears also mesh with the bevel gear 212 secured to the sleeve 214, similar to the sleeve 116, said sleeve being rotatably mounted on the shaft 52 journaled in the casing 62. The upper end of the sleeve is provided with the gear 216 similar to the gear 118, and meshing with the gear 120 provided on the price determining shaft 122, said shaft also being journalled in the casing 62 adjacent the shaft 52. The shaft 52, as before, is provided with a bevel gear 64 having meshing engagement with the bevel gear 66 (shown in Figure 2) for operating the amount indicating counters, all as particularly described.

It is of course understood that the construction shown in Figure 7 is provided with the shifting levers 148, 150 and 152, all as particularly shown and described in Figures 2 to 6 inclusive, the operation being the same. The operation of the mechanism shown in Figure 7 is, of course, exactly the same as that shown in Figures 2 to 6 inclusive, the bevel spider gears functioning in a similar manner to the driving gears 90 and 104, whereby the rotation of the sleeve 212 and consequently the shaft 122 is the resultant of the operation as effected by the gears 184, 188, and 196.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a speed variating device for the computing mechanism of a liquid dispensing apparatus, the combination of a rotatable shaft, a sleeve rotatably mounted thereon, a fixed gear mounted on said shaft and fixed against rotation, a cone gear mounted on said shaft and being provided with a plurality of varying gear steps, a gear rotatably mounted on said shaft and provided with a bearing portion having a gear thereon, a gear of different size from said third named gear mounted on said bearing portion and having a plurality of spur gears rotatably mounted thereon and having operative engagement with said fourth named gear, a bearing sleeve rotatably mounted on said shaft and having a gear portion having operative engagement with a gear portion of said spur gears, said bearing sleeve having a gear thereon, a gear of different size from said third and fifth named gears and having a plurality of spur gears rotatably mounted thereon and having operative engagement with said second named gear of said bearing sleeve, said first named sleeve having a gear portion in operative relation to a gear portion of said last named spur gears, a plurality of rotatable shafts mounted adjacent said first named shaft, a gear on each of said shafts respectively meshing with said third, fifth and eighth gears, a shifting lever slidably mounted on each of said last named shafts, said levers respectively having gears thereon operatively connected to the respective last named shafts and engageable with selected gear steps of said cone gear for causing varied rotation of said last named shafts, the gears on said levers being engageable with said fixed gear for selectively rendering any of the shafts of said levers inoperative.

2. In a speed variating device for the computing mechanism of a liquid dispensing apparatus, the combination of a rotatable shaft, a sleeve rotatably mounted thereon, a fixed gear mounted on said shaft and fixed against rotation, a cone gear mounted on said shaft and being provided with a plurality of varying gear steps, a gear rotatably mounted on said shaft and provided with a bearing portion having a gear fixed thereon, a gear of different size from said third named gear mounted on said bearing portion and having a plurality of bevel spider gears rotatably mounted thereon and having operative engagement with said fourth named gear, a bearing sleeve rotatably mounted on said shaft and having a gear having operative engagement with said bevel spider gears, said bearing sleeve having another gear thereon, a gear of different size from said third and fifth named gears and having a plurality of bevel spider gears rotatably mounted thereon and having operative engagement with said second named gear of said bearing sleeve, said first named sleeve having a gear meshing with said last named bevel spider gears, a plurality of rotatable shafts mounted adjacent said first named shaft, a gear on each of said shafts respectively meshing with said third, fifth and ninth gears, a shifting lever slidably mounted on each of said last named shafts, said levers respectively having gears thereon engageable with selected gear steps of said cone gear and operatively connected to said last named shafts for causing varied rotation of said last named shafts, the gears on said levers being engageable with said fixed gear for selectively rendering any of the shafts of said levers inoperative.

3. In a change speed gear set, the combination of a driving shaft, a plurality of gear steps of different diameter non-rotatably mounted thereon, a plurality of supplementary shafts disposed adjacent said driving shaft and having the axes thereof parallel to the axis of said driving shaft, a gear shift lever slidably mounted on each of said supplementary shafts, a first gear rotatably mounted on each of said levers and engageable with a selected gear step, calibrated quadrants, means on said gear shift levers for engaging said quadrants for locking the gear on said lever into position engaging the selected gear step, means operated by each gear on each of said levers for respectively rotating each of the supplementary shafts, means for selectively rendering any supplementary shaft inoperative, a second spur gear rotatably mounted on said driving shaft and having a bearing thereon terminating in a third gear, a connection between one of said supplementary shafts and said second gear, a fourth spur gear rotatably mounted on said bearing, a connection between another of said supplementary shafts and said fourth gear, a thimble rotatably mounted on said driving shaft and having a bearing portion and spaced fifth and sixth gears, a seventh driving gear pivotally mounted on said fourth gear, the axis of said seventh gear being parallel to the axis of said fourth gear, said seventh gear having gear portions meshing with said third and fifth gears, an eighth spur gear rotatably mounted on the bearing of said thimble, an operative connection between said eighth gear and yet another of said supplementary shafts, a driven shaft rotatably mounted on said driving shaft and having a ninth gear thereon, and a tenth driving gear rotatably mounted on said eighth gear, the axis of said tenth gear being parallel to the axis of said eighth gear, said tenth gear having gear portions meshing with said sixth and ninth gears.

4. In a change speed gear set, the combination of a driving shaft, a plurality of gear steps of different diameter non-rotatably mounted thereon, a plurality of supplementary shafts disposed adjacent said driving shaft, a gear shift lever slidably mounted on each of said supplementary shafts, a first gear rotatably mounted on each of said levers and engageable with a selected gear step, means operated by each gear on each of said levers for respectively rotating each of the supplementary shafts, a second spur gear rotatably mounted on said driving shaft and having a bearing thereon terminating in a third gear, a connection between one of said supplementary shafts and said second gear, a fourth spur gear rotatably mounted on said bearing, a connection between another of said supplementary shafts and said fourth gear, a thimble rotatably mounted on said driving shaft and having a bearing portion and spaced fifth and sixth gears, a seventh driving gear pivotally mounted on said fourth gear, the axis of said seventh gear being parallel to the axis of said fourth gear, said seventh gear having gear portions meshing with said third and fifth gears, an eighth spur gear rotatably mounted on the bearing of said thimble, an operative connection between said eighth gear and yet another of said supplementary shafts, a rotatably mounted driven shaft having a ninth gear thereon, and a tenth driving gear rotatably mounted on said eighth gear, the axis of said tenth gear being parallel to the axis of said eighth gear, said tenth gear having gear portions meshing with said sixth and ninth gears.

5. In a change speed gear set, the combination of a driving shaft, a plurality of gear steps of different diameter non-rotatably mounted thereon, a plurality of supplementary shafts disposed adjacent said driving shaft and having the axes thereof parallel to the axis of said driving shaft, a gear shift lever slidably mounted on each of said supplementary shafts, a first gear rotatably mounted on each of said levers and engageable with a selected gear step, calibrated quadrants, means on said gear shift levers for engaging said quadrants for locking the gear on said lever into position engaging said gear step, means operated by each gear on each of said levers for respectively rotating each of the supplementary shafts, means for rendering any supplementary shaft inoperative, a second spur gear having a bearing thereon terminating in a third gear, a connection between one of said supplementary shafts and said second gear, a fourth gear mounted on said bearing, a connection between another of said supplementary shafts and said fourth gear, a thimble having a bearing portion and spaced fifth and sixth gears, a seventh driving gear pivotally mounted on said fourth gear, said seventh gear having portions meshing with said third and fifth gears, an eighth spur gear rotatably mounted on the bearing of said thimble, an operative connection between said eighth gear and yet another of said supplementary shafts, a driven shaft having a ninth gear thereon, and a tenth driving gear rotatably mounted on said eighth gear, said tenth gear having gear portions meshing with said sixth and ninth gears.

6. In a change speed gear set, the combination of a driving shaft, a plurality of gear steps of different diameter non-rotatably mounted thereon, a plurality of supplementary shafts disposed adjacent said driving shaft and having the axes thereof parallel to the axis of said driving shaft, a gear shift lever slidably mounted on each of said supplementary shafts, a first gear rotatably mounted on each of said levers and engageable with a selected gear step, calibrated quadrants, means on said gear shift levers for engaging said quadrants for locking the gear on said lever into position engaging said gear step, means operated by each gear on each of said levers for respectively rotating each of the supplementary shafts, means for rendering any supplementary shaft inoperative, a second spur gear rotatably mounted on said driving shaft and having a bearing thereon terminating in a third gear, a connection between one of said supplementary shafts and said second gear, a fourth spur gear rotatably mounted on said bearing, a connection between another of said supplementary shafts and said fourth gear, a thimble rotatably mounted on said driving shaft and having a bearing portion and spaced fifth and sixth gears, a seventh driving gear pivotally mounted on said fourth gear, the axis of said seventh gear being parallel to the axis of said fourth gear, said seventh gear having gear portions meshing with said third and fifth gears, an eighth spur gear rotatably mounted on the bearing of said thimble, an operative connection between said eighth gear and yet another of said supplementary shafts, a driven shaft rotatably mounted on said driving shaft and having a ninth gear thereon, and a tenth driving gear rotatably mounted on said eighth gear, the axis of said tenth gear being parallel to the axis of said eighth gear, said tenth gear having gear portions meshing with said sixth and ninth gears, the gear portions of said driving gears being of different diameter.

7. In a change speed gear set, the combination of a driving shaft, a plurality of gear steps of different diameter non-rotatably mounted thereon, a plurality of supplementary shafts disposed adjacent said driving shaft, a gear shift lever slidably mounted on each of said supplementary shafts, a first gear rotatably mounted on each of said levers and engageable with a selected gear step, means operated by each gear on each of said levers for respectively rotating each of the supplementary shafts, a second spur gear having a bearing thereon terminating in a third gear, a connection between one of said supplementary shafts and said second gear, a fourth gear mounted on said bearing, a connection between another of said supplementary shafts and said fourth gear, a thimble having a bearing portion and spaced fifth and sixth gears, a seventh driving gear pivotally mounted on said fourth gear, said seventh gear having portions meshing with said third and fifth gears, an eighth spur gear rotatably mounted on the bearing of said thimble, an operative connection between said eighth gear and yet another of said supplementary shafts, a driven shaft having a ninth gear thereon, and a tenth driving gear rotatably mounted on said eighth gear, said tenth gear having gear portions meshing with said sixth and ninth gears.

8. In a change speed gear set, the combination of a driving shaft, a plurality of gear steps of different diameter non-rotatably mounted thereon, a plurality of supplementary shafts disposed adjacent said driving shaft and having the axes thereof parallel to the axis of said driving shaft, gear shift means slidably mounted on each of said supplementary shafts, a first gear rotatably mounted on each of said gear shift means and engageable with a selected gear step, calibrated setting means, means on said gear shift means for engaging said setting means for locking the gear on said gear shift means into position engaging said gear step, means operated by the gear on said gear shift means for rotating the supplementary shafts, a driven shaft, spur gears operatively connected to different supplementary shafts, and a driving gear provided with a pinion of different size than the driving gear differentially connecting said spur gears and driven shaft.

EDWARD A. SLYE.